United States Patent
Wang et al.

(10) Patent No.: US 12,468,885 B2
(45) Date of Patent: Nov. 11, 2025

(54) METHOD OF TRAINING SENTIMENT PREFERENCE RECOGNITION MODEL FOR COMMENT INFORMATION, RECOGNITION METHOD, AND DEVICE THEREOF

(71) Applicant: Beijing Academy of Artificial Intelligence, Beijing (CN)

(72) Inventors: Yequan Wang, Beijing (CN); Hengran Zhang, Beijing (CN); Aixin Sun, Beijing (CN)

(73) Assignee: Beijing Academy of Artificial Intelligence, Beijing (CN)

( * ) Notice: Subject to any disclaimer, the term of this patent is extended or adjusted under 35 U.S.C. 154(b) by 293 days.

(21) Appl. No.: 18/137,662

(22) Filed: Apr. 21, 2023

(65) Prior Publication Data

US 2024/0078384 A1 Mar. 7, 2024

(30) Foreign Application Priority Data

Sep. 5, 2022 (CN) .......................... 202211078798.2

(51) Int. Cl.
*G06F 40/40* (2020.01)
*G06F 16/35* (2019.01)
(Continued)

(52) U.S. Cl.
CPC ............ *G06F 40/279* (2020.01); *G06F 16/35* (2019.01)

(58) Field of Classification Search
CPC .... G06F 40/30; G06F 16/9577; G06F 40/284; G06F 40/279; G06F 40/295
See application file for complete search history.

(56) References Cited

U.S. PATENT DOCUMENTS 10,037,491 B1 * 7/2018 Fang .................... G06F 21/6218
11,907,990 B2 * 2/2024 Byron ................ G06Q 30/0627
(Continued)

FOREIGN PATENT DOCUMENTS

CN    108415972 A    8/2018
CN    111144374 A    5/2020
(Continued)

OTHER PUBLICATIONS

Han et al, "Ptr: Prompt tuning with rules for text classification", Jan. 2022, AI Open. Jan. 1, 2022;3:182-92. (Year: 2022).*

(Continued)

*Primary Examiner* — Olujimi A Adesanya
(74) *Attorney, Agent, or Firm* — Thomas Horstemeyer, LLP

(57) ABSTRACT

The present application discloses a method of training a sentiment preference recognition model for comment information, a recognition method and device thereof, which belong to the field of natural language processing technology. The method of training a sentiment preference recognition model for comment information includes training and optimizing, based on each piece of comment information, and corresponding original text template and mirrored text template thereof, a sentiment preference recognition model in the original channel and the mirror channel, so that the sentiment preference recognition model is used to output a sentiment preference result for the two comparison objects in the comment information in terms of the attribute.

18 Claims, 3 Drawing Sheets

(51) Int. Cl.
*G06F 40/279* (2020.01)
*G06F 40/284* (2020.01)

(56) References Cited

U.S. PATENT DOCUMENTS

| | | | |
|---|---|---|---|
| 11,966,872 B2* | 4/2024 | Wu | G06Q 30/0282 |
| 2019/0213465 A1* | 7/2019 | Avrahami | G10L 15/197 |
| 2021/0264480 A1* | 8/2021 | Silverstein | G06F 16/951 |
| 2022/0237386 A1* | 7/2022 | Cheng | G06F 40/205 |

FOREIGN PATENT DOCUMENTS

| | | | | |
|---|---|---|---|---|
| CN | 114021573 B | * | 4/2022 | G06F 16/367 |
| CN | 114979346 A | | 8/2022 | |
| WO | 2018217665 A1 | | 11/2018 | |

OTHER PUBLICATIONS

Panchenko et al, "Categorizing comparative sentences", 2018, arXiv preprint arXiv:1809.06152. Sep. 17, 2018. (Year: 2018).*

Ma et al., "Entity-aware dependency-based deep graph attention network for comparative preference classification", Jul. 2020, inProceedings of the 58th annual meeting of the association for computational linguistics Jul. 2020. (Year: 2020).*

Chen et al, "Knowprompt: Knowledge-aware prompt-tuning with synergistic optimization for relation extraction", Apr. 2022, inProceedings of the ACM Web conference 2022 Apr. 25, 2022 (pp. 2778-2788). (Year: 2022).*

Kessler et al, "Detection of product comparisons-how far does an out-of-the-box semantic role labeling system take you?", 2013, inProceedings of the 2013 conference on empirical methods in natural language processing Oct. 2013 (pp. 1892-1897). (Year: 2013 ).*

Liu et al., A Dual-Channel Framework for Sarcasm Recognition by Detecting Sentiment Conflict, Cornell University, ArXiv>CS>arXIV:2109.03587v1 [cs.CL], Sep. 8, 2021, pp. 1-10.

Notice of Allowance issued in co-pending Chinese patent application No. 202211078798.2 dated Oct. 13, 2022.

Li et al., "Powering Comparative Classification with Sentiment Analysis via Domain Adaptive Knowledge Transfer", arxiv.org, Cornell University Library, NY, Sep. 7, 2021, XP091051067.

Yang et al., "Few-Shot Multi-Modal Sentiment Analysis with Prompt-Based Vision-Aware Language Modeling", 2022 IEEE International Conference on Multimedia and Expo (ICME), Jul. 18, 2022, p. 1-6, XP034175724.

Extended European Search Report issued in co-pending Chinese patent application No. 23275068.7-1203 dated Jan. 25, 2024.

* cited by examiner

METHOD OF TRAINING SENTIMENT PREFERENCE RECOGNITION MODEL FOR COMMENT INFORMATION, RECOGNITION METHOD, AND DEVICE THEREOF

CROSS-REFERENCE TO RELATED APPLICATION

This application is based upon and claims priority to Chinese Patent Application No. 202211078798.2, filed on Sep. 5, 2022, the entire contents thereof are incorporated herein by reference.

TECHNICAL FIELD

The present application relates to the field of natural language processing technology and, in particular, to a method of training a sentiment preference recognition model for comment information, a method of sentiment preference recognition for comment information, and a related electronic device and computer-readable storage medium thereof.

BACKGROUND

Online media has become a platform for users to share their opinions and emotions. Analyzing the opinions and sentiment preferences of comments posted on the Web is very important and highly informative in the future decisions of a company or organization. Comparative Opinion is a subfield of opinion mining and sentiment preference analysis, which deals with recognizing and extracting information expressed in a comparative form for example, comparing the sentiment comparison results of text messages of comments given by users for two objects. For example, "Product A handles better than product B, which I like, but product B has a really nice interior, which makes it hard for me to choose". In this example, it is clear that the sentiment contrast between the two comparison objects "Product A" and "Product B" is expressed in terms of "handling" and "interior aesthetics". Based on product research and other needs, companies or organizations, etc., can understand users' sentiment preferences for certain attributes of different products, such as understanding users' sentiment preferences for their own products and competitive products in terms of usage performance, etc. Therefore, it is necessary to perform comparative opinion mining, that is, to recognize the sentiment preferences in the comments given by the users for two objects.

SUMMARY

The present application provides the following technical solutions.

In a first aspect, the present application provides a method of training a sentiment preference recognition model for comment information, including:
  generating in an original channel an original text template corresponding to each group of comment training data, where each group of comment training data includes: one piece of comment information, and two comparison objects and an attribute that are extracted from the comment information; generating in a mirror channel a mirrored text template formed by exchanging positions of the two comparison objects in the original text template; and
  training and optimizing, based on each piece of comment information, and corresponding original text template and mirrored text template thereof, a sentiment preference recognition model in the original channel and the mirror channel, so that the sentiment preference recognition model is used to output a sentiment preference result for the two comparison objects in the comment information in terms of the attribute.

In a second aspect, the present application provides a method of sentiment preference recognition for comment information, including:
  obtaining candidate target comment information, where the candidate target comment information includes two comparison objects and a target attribute;
  generating a target text template for the candidate target comment information based on the two comparison objects and the target attribute, where the target text template includes: an original text template and/or a mirrored text template; and
  inputting the target text template into a predetermined sentiment preference recognition model, so that the sentiment preference recognition model outputs a sentiment preference result of the two comparison objects in the candidate target comment information for the target attribute.

Here, the sentiment preference recognition model is pre-trained based on the method of training a sentiment preference recognition model for comment information as described in the preceding first aspect, and the sentiment preference recognition model is selected from the sentiment preference recognition model in the original channel and/or the sentiment preference recognition model in the mirror channel based on the target text template.

In a further aspect, the present application provides an electronic device including a processor and a memory storing a plurality of instructions, where the processor is configured to read the instructions and to execute the method of the first or second aspect as describe above.

In a further aspect, the present application provides a non-transitory computer-readable storage medium, where the computer-readable storage medium stores a plurality of instructions, the plurality of instructions being readable by a processor to execute the method of the first or second aspect as described above.

DETAILED DESCRIPTION

Figure 1:
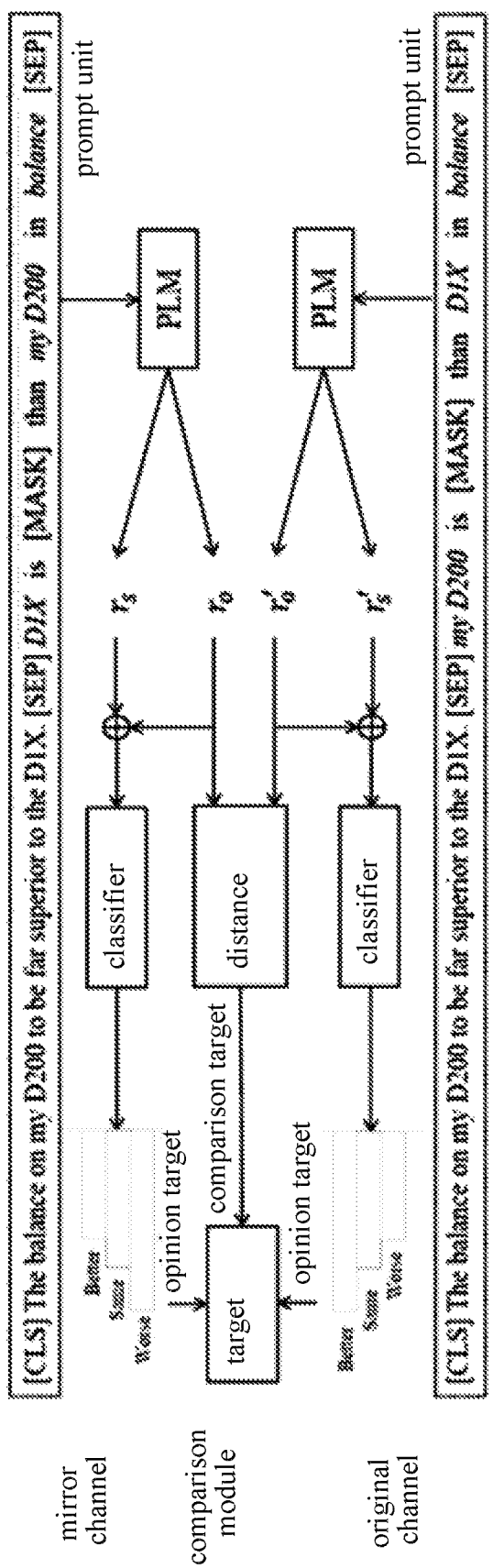
FIG. 1 is a schematic diagram of a structure of a sentiment preference recognition model for comment information, as described in the present application.

In order to better understand the above technical solutions, the above technical solutions will be described in detail below in conjunction with the accompanying drawings and specific embodiments of the specification.

The methods provided by the present application may be implemented in a terminal environment in which the terminal may include one or more of the following components: a processor, a memory, and a display. At least one instruction is stored in the memory, and the at least one instruction is loaded and executed by the processor to implement the method described in the following embodiments.

The processor may include one or more processing cores. The processor uses various interfaces and lines to connect various parts within the entire terminal to perform various functions of the terminal and process data by running or executing instructions, programs, code sets, or instruction sets stored in memory, and by calling data stored in memory.

The memory can include Random Access Memory (RAM) or Read-Only Memory (ROM). The memory can be used to store instructions, programs, code, code sets, or directives.

The display is used to show the user interface of each application.

In addition, a person skilled in the art may understand that the above structure of the terminal does not constitute a limitation of the terminal, and the terminal may include more or fewer components, or a combination of certain components, or a different arrangement of components. For example, the terminal also includes components such as RF circuits, input units, sensors, audio circuits, power supplies, etc., which will not be repeated here.

The mechanism of sentiment preference recognition for comment information in the prior art generally uses rule-based recognition or traditional machine learning model recognition based on a combination of feature engineering and classifier. However, since the existing methods of sentiment preference recognition for comment information are susceptible to the influence on the order of the comparison objects in the sentence, i.e., they are sensitive to the order of the comparison objects in the sentence, the discrimination accuracy of the comparison opinion will drop sharply when the positions of the comparison objects in the comment information are exchanged. Moreover, the existing sentiment recognition models are all primary models, and the intelligence and accuracy of the recognition means are relatively low, which cannot support the practical application of comparative opinion recognition.

In order to improve the accuracy and effectiveness of sentiment preference recognition for comment information and reduce the influence of changing the relative order of comparison objects in a sentence on the recognition results, the present application proposes a method of training a sentiment preference recognition model for comment information, and a method of sentiment preference recognition for comment information based on the model training method. In the construction and training phases of the model, a dual-channel modeling approach is used to effectively represent user's sentiment. Using the dual-channel structure, sentences with different relative positions of comparison objects are input into a pre-trained language model for pre-training, making the model more insensitive to the relative order of comparison objects in the sentences, thus achieving good results even if the comparison objects are swapped. In the application phase of the model, a prompt-learning method of the pre-trained language model can achieve good results even using a small amount of training data, and improve the performance of comparison opinion analysis to a practically usable level.

Referring to FIG. 1, the present application introduces a dual-channel sentiment preference recognition model for comment information formed based on a pre-trained language model (PLM), specifically including a model training phase and a model application phase. The sentiment preference recognition model for comment information includes: two opinion channels, referred to as the original channel and the mirror channel, and a comparison module. Each channel includes a prompt unit, an encoding unit, and a classifier in turn. The outputs of the original channel and the mirror channel are connected to the comparison module.

The prompt unit is used to generate a text template for the current channel based on the comparison object(s) and the attribute(s) preset by the user and send it to the encoding unit which can also be referred to as PLM. The encoding unit is used to compose the input data from the pre-obtained original sentence and the text template of the current channel and perform an encoding operation to generate a sentence expression vector at the [CLS] position and an opinion expression vector at the [MASK] position in FIG. 1. The pre-obtained original sentence can be derived from a large-scale training set composed of historical comment information. The classifier is used to perform prediction based on the sentence expression vector and the opinion expression vector output by the encoding unit. The two encoding units in the mirror channel and the original channel can share the encoding parameters. The comparison module is applied in the model training phase for receiving the opinions output from the two channels and distinguishing the logical relationships among opinions significantly in order to improve the robustness of the model with respect to different opinion expressions. The comparison module can further distinguish the logically opposite opinions significantly. For example, the opinion output from one channel (e.g., the original channel) is "better", and the opinion output from the other channel (e.g., the mirror channel) is "worse", which means that the two output opinions are opposite, and the comparison module can significantly distinguish the two opposite opinions. For another example, when the opinions output from two channels are both "same", since the logical opposite of "same" is still "same", the comparison module can logically distinguish the opinions output from the two channels significantly.

Embodiment I

Figure 2:
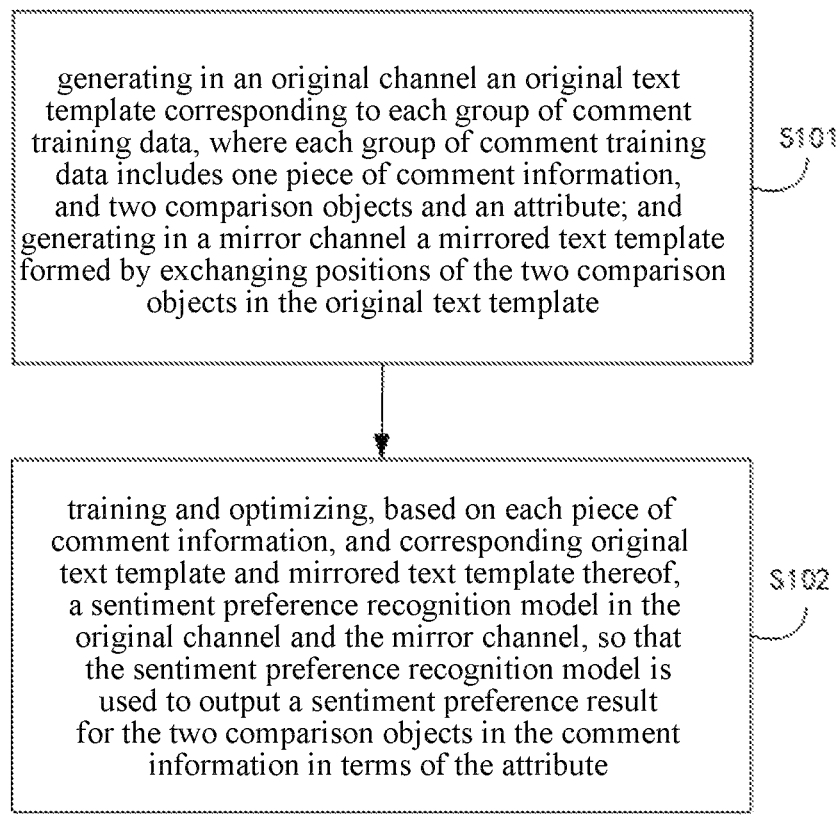
FIG. 2 is a flow chart of a method of training a sentiment preference recognition model for comment information, as described in the present application.

As shown in FIG. 2, in a first aspect of the present application, there is provided a method for training a sentiment preference recognition model for comment information, including the following steps S101 and S102.

S101, generating in an original channel an original text template corresponding to each group of comment training data, where each group of comment training data includes one piece of comment information, and two comparison objects and an attribute that are extracted from the comment information; and generating in a mirror channel a mirrored text template formed by exchanging positions of the two comparison objects in the original text template.

The difference, between the text templates generated by the original channel and the mirror channel of the present application, lies in the different order of appearance of the two comparison objects, with the aim of stimulating the pre-trained language model to interpret the deeper meaning of the compared sentences. In the case where a sentence S with comparison objects $t_1$ and $t_2$ and the attribute a to be compared, the prompt unit can generate a template $S_p$, i.e., "S[SEP]$t_1$ is [MASK] than $t_2$ in a [SEP]", for the original channel and, in a similar way, a template $S_m$, i.e., "S[SEP]$t_2$ is [MASK] than $t_1$ in a [SEP]", for the mirror channel. Here, [MASK] can indicate a comparison result such as "better", "same" or "worse". [SEP] is a special character of the BERT model, and here it represents a separator between the original sentence and the template sentence. Different pre-trained language models can be defined with different separators.

The present application aims to stimulate the knowledge expression of the pre-trained language model itself about compared sentences by this structural design.

The "same", "better" and "worse" of the sentiment preference results are three sentiment preference labels with different levels of expression. The label "same" is used to indicate that the user who sent the comment considers the two comparison objects to be equivalent in terms of the target attribute from a sentiment preference perspective, and that there is no good or bad. The label "better" is used to indicate that the user who sent the comment considers that one of the two comparison objects is better than the other in terms of the target attribute from a sentiment preference perspective. In contrast, the label "worse" is used to indicate that the user who sent the comment considers that one of the two comparison objects is worse than the other in terms of the target attribute.

It will be understood that, the sentiment preference labels can be set to more degree labels according to the actual application needs, for example, the label "better" can be further divided into the labels "a little better" and "much better", not limited to the current number of labels, which can be specified according to the actual needs.

Referring to the example depicted in FIG. 1, the text template of the original channel is "my D200 is [MASK] than D1X in balance", while the text template of the mirror channel is "D1X is [MASK] than my D200 in balance". The comparison objects can be two products, i.e., "my D200" and "D1X", and the attribute to be compared can be "balance".

It can be seen that only the order of the comparison objects is different between the templates of the two channels, and the rest of the templates of the two channels are identical. Accordingly, the true labels of the original text template and the mirrored text template are logically opposite during the training process, e.g., "better" and "worse", respectively. As described above, it should be noted that when the true labels of the original text template and the mirrored text template are both "same", the two true labels are also be called logically opposite.

S102, training and optimizing, based on each piece of comment information, and corresponding original text template and mirrored text template thereof, a sentiment preference recognition model in the original channel and the mirror channel, so that the sentiment preference recognition model is used to output a sentiment preference result for the two comparison objects in the comment information in terms of the attribute.

The sentiment preference recognition model of the present application can be divided into two modules: a pre-trained language model and a classifier. In the dual-channel structure, the sentiment preference recognition model of the original channel can be further divided into a first pre-trained language model and a first classifier. The sentiment preference recognition model of the mirror channel can accordingly be divided into a second pre-trained language model and a second classifier. It will be understood by those skilled in the art that the specific training process of the mirror channel is similar to that of the original channel due to the similarity of the dual-channel structure. Therefore, only the training process of the original channel is described in detail in this disclosure.

Further, the training process of step S102 of the present application may include the following steps S1021, S1022, and S1023.

S1021, training, based on each piece of comment information and corresponding original text template thereof, a first pre-trained language model in the original channel, and employing a first classifier in the original channel to generate a first sentiment preference prediction result corresponding to the comment information based on the result data output from the first pre-trained language model; and training, based on each piece of comment information and corresponding mirrored text template thereof, a second pre-trained language model in the mirror channel, and employing a second classifier in the mirror channel to generate a second sentiment preference prediction result corresponding to the comment information based on the result data output from the second pre-trained language model.

First, the pre-trained language model serves as an encoding unit for encoding the input comment information and the corresponding original text template or mirrored text template immediately afterwards to output the result data of the comment information. The result data may include a sentence expression vector and an opinion expression vector.

The text processed by the prompt unit is input to the encoding unit for encoding. Taking the template $S_p$ of the original channel as an example, it is encoded to obtain the sentence expression vector $r_s$ (i.e., the global expression vector) which is the hidden vector at position [CLS] in FIG. 1, and the opinion expression vector $r_o$ which is the hidden vector at position [MASK] in FIG. 1 according to the following formula.

$$r_s, r_o = PLM(S_p) \quad \text{Formula 1}$$

PLM represents the pre-trained language model. Referring to FIG. 1, the final vector to be classified can be the vector $r = r_s \oplus r_o$ by concatenating $r_s$ with $r_o$.

In a specific embodiment, any one of the generic pre-training models such as ROBERTa, BERT or XLNet can be selected.

The classifier is used to generate an opinion probability distribution of the comment information based on the result data $r = r_s \oplus r_o$ output from the pre-trained language model in the current channel as a sentiment preference prediction result corresponding to the comment information. The sentiment preference prediction result includes the respective percentages of different expressions of sentiment preference (e.g., same, better, and worse).

In a preferred embodiment, the opinion probability distribution P can be obtained by performing calculation on the final expression r through softmax layer, according to the following formula.

$$P = \text{softmax}(W_p r + b_p) \quad \text{Formula 2}$$

Here, $W_p$ and $b_p$ are the parameters for network learning.

The design of the dual-channel structure reflects the linguistic meaning of the comparative opinion. For example, "Car A handles better than Car B" and "Car B handles worse than Car A" have the same meaning, although the order of the objects to be compared is different.

Accordingly, the mirror channel adopts a similar approach to perform calculation as follows.

$$r_s', r_o' = PLM(S_m) \quad \text{Formula 3}$$

$$P' = \text{softmax}(w_p r' + b_p) \quad \text{Formula 4}$$

Here, $r_s'$ and $r_o'$ are the global expression vector and the opinion expression vector of the mirror channel. Similarly, the result data r' output from the pre-trained language model is the final expression of the mirror channel. The opinion probability distribution P' can also be computed in the same way. It can be seen that the true labels of P and P' should be opposite when the opinion is not "same", e.g., when the opinion is not "t1 is the same as t2 in a" or "t2 is the same as t1 in a".

S1022, generating a current opinion target based on the first sentiment preference prediction result and the second sentiment preference prediction result, and, generating a current comparison target based on the opinion expression vector in the result data output by the first pre-trained language model and the second pre-trained language model, respectively.

In order to distinguish opposite opinions significantly and improve the robustness of the model in different opinion expressions, the pre-trained language model of the present application calculates two training target values, i.e., the opinion target as well as the comparison target. Here, the opinion target is intended to be used to minimize the cross-entropy function of the opinion distribution of the two channels. And the comparison target is used to distinguish the logical relationships among opinions significantly, i.e., to maximize the expression distance of the [MASK] in two channels when the opinion is "better" or "worse" and to minimize the distance when the opinion is "same".

Thus, when the current opinion target is generated based on the first and second sentiment preference prediction results, a minimization calculation of the cross-entropy function is performed on the first and second sentiment preference prediction results using the cross-entropy function of the original channel and the mirror channel as the opinion target loss function.

In a preferred embodiment of above description, with each input instance of the two channels, the models obtain two opinion probability distributions P and P', and the opinion target loss function $J(\theta)$ is obtained by calculation, i.e., the cross-entropy loss function for the two channels, according to the following formulas.

$$\phi = \sum_i \text{cross-entropy}(y_i, P_i) \quad \text{Formula 5}$$

$$\phi' = \sum_i \text{cross-entropy}(y_i', P_i') \quad \text{Formula 6}$$

$$J(\theta) = \lambda\phi + \mu\phi' \quad \text{Formula 7}$$

Here, "cross-entropy ( )" is the representation of the cross-entropy operation. $\phi$ and $\phi'$ are the loss functions of the original channel and the mirror channel, respectively. $\lambda$ and $\mu$ are the hyper-parameters of the model. $y_i$ denotes the true opinion of the $i^{th}$ instance in the original channel, $P_i$ is the predicted opinion probability of the $i^{th}$ instance in the original channel, and $y_i'$ and $P_i'$ are the true opinion and predicted opinion probability of the $i^{th}$ instance in the mirror channel, respectively.

In the present application, different hyper-parameters are predefined for different pre-trained language models.

Specifically, when generating the current comparison target based on the opinion expression vectors in the result data output by the first and second pre-trained language models respectively, the cosine similarity between the opinion expression vectors in the result data output by the first and second pre-trained language models can be obtained.

For example, due to the exchange of the order of the objects to be compared, when the opinion o of the original channel is "better", the opinion o' of the mirror channel is "worse" accordingly, and vice versa. When the opinion o of the original channel is "same", the opinion o' of the mirror channel is also "same" accordingly. Therefore, the comparison module aims to maximize the distance between the opinion expression vectors of the two channels when the opinion o or o' is "better" or "worse", and similarly, to minimize the distance between the two channels when the opinion o or o' is "same". For example, the following training target can be designed to consider the distances computed by the comparison module.

$$d = 1 - \cos(W_o r_o + b_o, W_o r_o' + b_o) \quad \text{Formula 8}$$

Here, d is the distance calculated by cosine similarity, and $W_o$ and $b_o$ are the parameters for network learning.

In this case, if the opinion expression vectors in the result data output by the first and second pre-trained language models are "better" and "worse", respectively, the distance maximization calculation can be performed on the opinion expression vectors $r_o$ and $r_o'$ respectively output by the first pre-trained language model and second pre-trained language model by taking the hinge loss function of the cosine similarity as the comparison target loss function, to obtain the current comparison target.

On the other hand, if the opinion expression vectors in the result data output by the first pre-trained language model and the second pre-trained language model are both "same", the distance minimization calculation can be performed on the opinion expression vectors $r_o$ and $r_o'$ respectively output by the first pre-trained language model and the second pre-trained language model by taking the hinge loss function of the cosine similarity as the comparison target loss function, to obtain the current comparison target.

In this embodiment, the above hinge loss function is expressed as the comparison target loss $U(\theta)$ by the following formula.

$$U(\theta) = \sum_i \begin{cases} d_i, & \text{if } o_i = \text{same} \\ \max(0, 1-d_i), & \text{if } o_i \neq \text{same} \end{cases} \quad \text{Formula 9}$$

$o_i$ denotes the comparison opinion of the $i^{th}$ instance, and $d_i$ denotes the distance of the $i^{th}$ instance in the comparison module.

S1023, performing target optimization on the first pre-trained language model, the second pre-trained language model, the first classifier and the second classifier using the current comparison target and the current opinion target, and iteratively training the optimized first pre-trained language model, the optimized second pre-trained language model, the optimized first classifier and the optimized second classifier.

In the process of target optimization of the first and second pre-trained language models, and the first and second classifiers, the target function for model training can be calculated based on the current comparison target and the current opinion target.

Considering the two targets, the final target function L is the sum of J and U according to the following formula.

$$L(\theta) = J(\theta) + \xi U(\theta) \quad \text{Formula 10}$$

Here, $\xi$ is a predefined hyper-parameter for the pre-trained language model.

Finally, based on the final target function L obtained from the opinion target as well as the comparison target, the target fine-tuning optimization is performed on the first and second pre-trained language models (encoders), and the first and second classifiers in the sentiment preference recognition model for comment information. In optional embodiments, the above training method can be further iteratively executed to train the sentiment preference recognition model for comment information several times until the model converges. The final training result obtained includes a first encoder and a first classifier for the original channel, and a second encoder and a second classifier for the mirror channel.

Here, the parameters of the first pre-trained language model and the second pre-trained language model are shared, and the parameters of the first classifier and the second classifier are also shared.

It can be seen that by the above method of the present application, a high-performance dual-channel design is used to effectively represent user's sentiment, and sentences with different relative positions of comparison objects are input into a model for pre-training, making the model more insensitive to the relative order of comparison objects in the sentences, thus achieving good recognition results even if the comparison objects are swapped, and improving the accuracy of sentiment preference recognition. The prompt-learning method based on the pre-trained language model of the present application makes it possible to obtain good sentiment recognition results even with a small set of comment training data, and the performance of comparative opinion analysis can reach a level that can be practically used in industry.

According to the embodiment of the present application, there is provided a method of training a sentiment preference recognition model for comment information, including: generating in an original channel an original text template corresponding to each group of comment training data, where each group of comment training data includes: one piece of comment information, and two comparison objects and an attribute that are extracted from the comment information; generating in a mirror channel a mirrored text template formed by exchanging positions of the two comparison objects in the original text template; and training and optimizing, based on each piece of comment information, and corresponding original text template and mirrored text template thereof, a sentiment preference recognition model in the original channel and the mirror channel, so that the sentiment preference recognition model is used to output a sentiment preference result for the two comparison objects in the comment information in terms of the attribute.

Optionally, the sentiment preference recognition model includes: a pre-trained language model and a classifier. The pre-trained language model is configured to encode input comment information and corresponding original text template thereof or corresponding mirrored text template thereof to output result data of the comment information, where the result data includes: a sentence expression vector and an opinion expression vector. The classifier is configured to generate, based on the result data output by the pre-trained language model in a same channel as the classifier, a sentiment preference prediction result corresponding to the comment information, where the sentiment preference prediction result includes respective percentages of same, better and worse in sentiment preference.

Optionally, the training and optimizing, based on each piece of comment information, and corresponding original text template and mirrored text template thereof, a sentiment preference recognition model in the original channel and the mirror channel, further includes: training, based on each piece of comment information and corresponding original text template thereof, a first pre-trained language model in the original channel, and employing a first classifier in the original channel to generate a first sentiment preference prediction result corresponding to the comment information based on the result data output from the first pre-trained language model; training, based on each piece of comment information and corresponding mirrored text template thereof, a second pre-trained language model in the mirror channel, and employing a second classifier in the mirror channel to generate a second sentiment preference prediction result corresponding to the comment information based on the result data output from the second pre-trained language model: generating a current opinion target based on the first sentiment preference prediction result and the second sentiment preference prediction result, and, generating a current comparison target based on the opinion expression vector in the result data output by the first pre-trained language model and the second pre-trained language model, respectively; and performing target optimization on the first pre-trained language model, the second pre-trained language model, the first classifier and the second classifier using the current comparison target and the current opinion target, and iteratively training the optimized first pre-trained language model, the optimized second pre-trained language model, the optimized first classifier and the optimized second classifier.

Optionally, the generating a current opinion target based on the first sentiment preference prediction result and the second sentiment preference prediction result, further includes: performing a minimization calculation for cross-entropy function on the first sentiment preference prediction result and the second sentiment preference prediction result by taking a cross-entropy function of the original channel and a cross-entropy function of the mirror channel as an opinion target loss function, to obtain the current opinion target.

Optionally, the generating a current comparison target based on the opinion expression vector in the result data output by the first pre-trained language model and the second pre-trained language model, respectively, further includes: obtaining a cosine similarity between the opinion expression vectors in the result data output by the first pre-trained language model and the second pre-trained language model; and in response to the opinion expression vectors in the result data output by the first pre-trained language model and the second pre-trained language model being better and worse, respectively, performing distance maximization calculation on the opinion expression vector output by each of the first pre-trained language model and the second pre-trained language model by taking a hinge loss function of the cosine similarity as a comparison target loss function, to obtain the current comparison target.

Optionally, the generating a current comparison target based on the opinion expression vector in the result data output by the first pre-trained language model and the second pre-trained language model, respectively, further includes: in response to the opinion expression vectors in the result data output by the first pre-trained language model and the second pre-trained language model being both the same, performing distance minimization calculation on the opinion expression vector output by each of the first pre-trained language model and the second pre-trained language model by taking a hinge loss function of the cosine similarity as a comparison target loss function, to obtain the current comparison target.

Optionally, the performing target optimization on the first pre-trained language model, the second pre-trained language model, the first classifier and the second classifier using the current comparison target and the current opinion target, further includes: calculating a target function for model training based on the current comparison target and the current opinion target; and performing target optimization on the first pre-trained language model, the second pre-trained language model, the first classifier and the second classifier based on the target function, where the first pre-trained language model and the second pre-trained language model share parameters, and the first classifier and the second classifier share parameters.

Embodiment II

Figure 3:
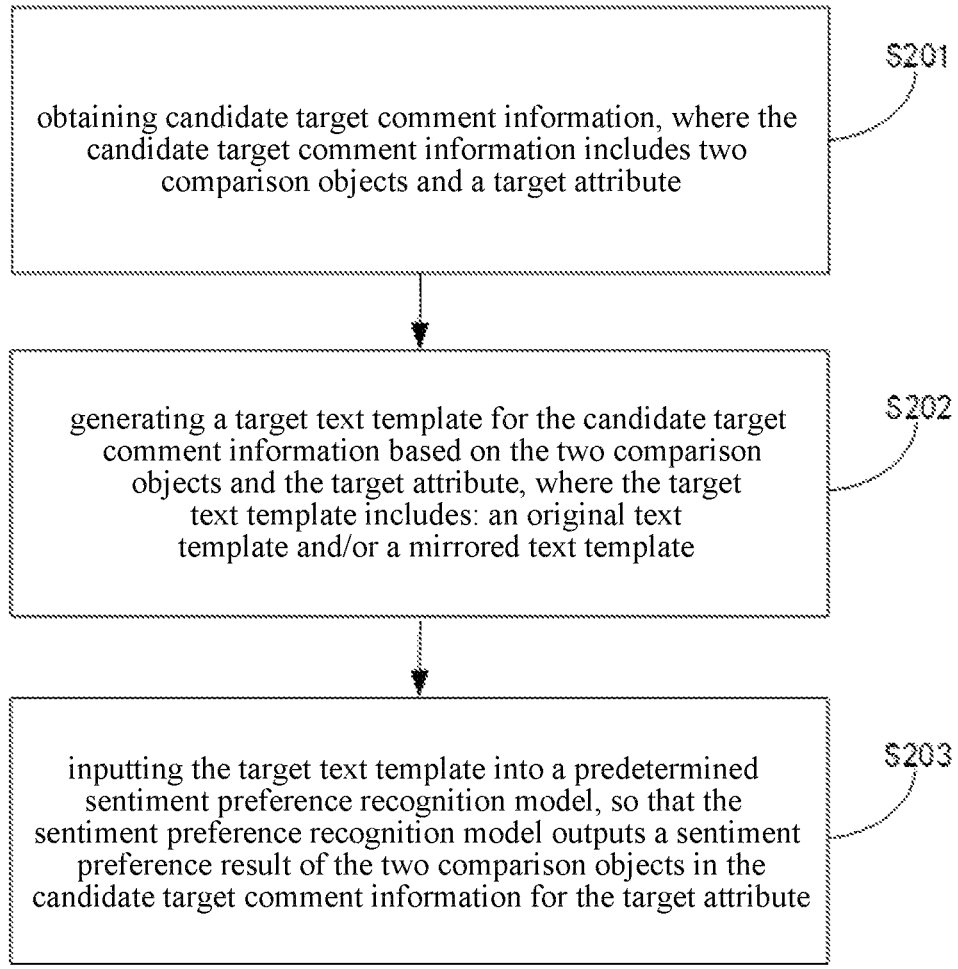
FIG. 3 is a flow chart of a method of sentiment preference recognition for comment Information, as described in the present application.

Based on the method of training a sentiment preference recognition model for comment information in the first aspect described above, as shown in FIG. 3, the present application provides, in a second aspect, a method of sentiment preference recognition for comment information, including the following steps S201, S202, and S203.

S201, obtaining candidate target comment information, where the candidate target comment information includes two comparison objects and a target attribute.

S202, generating a target text template for the candidate target comment information based on the two comparison objects and the target attribute, where the target text template includes: an original text template and/or a mirrored text template.

S203, inputting the target text template into a predetermined sentiment preference recognition model, where the sentiment preference recognition model is pre-trained based on the method of training a sentiment preference recognition model for comment information as described in the preceding Embodiment I.

Since the model is based on a dual-channel structure and two channels are trained to obtain paired sentiment preference recognition models, the sentiment preference recognition model used in the model application phase can be selected from the sentiment preference recognition model in the original channel and/or the sentiment preference recognition model in the mirror channel based on the target text template, so that the sentiment preference recognition model outputs the sentiment preference result for the two comparisons objects in the target comment information in terms of the target attribute.

The process of sentiment preference recognition in the model application phase is described below in conjunction with a specific example.

S1, obtaining the candidate target comment information, two comparison objects and the target attribute. For example, the target comment information posted by a user on an e-commerce website is "Seat A is less expensive than Seat B, but not as comfortable as Seat B. I'm still debating which one to buy". In order to identify the user's sentiment preference for the two products in terms of comfort in the target comment information, "Seat A" and "Seat B" are determined as two comparison objects with the attribute "comfort".

S2, generating, by the prompt units in the original channel and the mirror channel of the trained sentiment preference recognition model, the original text template and the mirrored text template based on the target comment information, the two comparison objects and the attribute, respectively, where the positions of the comparison objects in the original text template and the mirror text template are set in mirror image. That is, the comparison object "Seat A" in the original text template can be set in the subject position, while the comparison object "Seat A" in the mirrored text template is in the object position. For example, the original text template is "Seat A is [MASK] than Seat B in comfort", and the mirrored text template is "Seat B is [MASK] than Seat A in comfort".

S3, inputting the original comment information and the original text template into a first encoder in the original channel generated based on the pre-trained language model, so that the first encoder outputs a global expression $r_s$ and an opinion expression $r_o$ corresponding to the original text template, referring to Formula 1;

inputting the original comment information and the mirrored text template into a second encoder in the mirror channel generated based on the pre-trained language model, so that the second encoder outputs a global expression $r_s'$ and an opinion expression $r_o'$ corresponding to the mirrored text template, where the first encoder and the second encoder share parameters.

S4, inputting the global expression $r_s$ and the opinion expression $r_o$ corresponding to the original text template are input to the first classifier corresponding to the original channel, so that the first classifier outputs the opinion probability distribution P corresponding to the original text template, referring to Formula 2. The result P includes the percentages of respective sentiment preference labels. For example, there can be three types of sentiment preference labels: "better", "same", and "worse", and the opinion probability distribution P may include, for example, "better" at 11%, "same" at 23%, and "worse" at 66%. This indicates that most of the opinions are that "Seat A is worse than Seat B in comfort".

Similarly, the global expression $r_s'$ and the opinion expression $r_o'$ corresponding to the mirrored text template are input into the second classifier corresponding to the mirror channel, referring to Formula 3, so that the second classifier outputs the opinion probability distribution P' corresponding to the mirrored text template, referring to Formula 4, which similarly includes the percentages of respective sentiment preference labels. For example, P' may include: "better" at 75%, "same" at 19%, and "worse" at 6%. The first classifier and the second classifier share parameters. The opinion probability distribution P' indicates that the most of the opinions are that "Seat B is better than Seat A in comfort".

S5, determining the sentiment preference recognition result for the two comparison objects based on the opinion probability distribution P corresponding to the original text template and/or the opinion probability distribution P' corresponding to the mirrored text template. For example, the sentiment preference represented by the opinion probability distribution P corresponding to the original text template is "Seat A is [worse] than Seat B in comfort", and the sentiment preference represented by the opinion probability distribution P' corresponding to the mirrored text template is "Seat B is [better] than Seat A in comfort".

The final sentiment preference recognition result obtained can contain at least one of the following two sentences:

"Seat A is [worse] than Seat B in comfort"; or

"Seat B is [better] than Seat A in comfort."

It can be seen that when the output opinion is "better" or "worse", the sentiment labels of the first and second sentiment preference prediction results are opposite, but the opposite opinions are treated for significance discrimination, allowing the recognition model be enhanced for robustness in different opinion expressions. The two sentences obtained by the prediction have exactly the same point of view, and the results obtained by the sentiment preference recognition method are not "misleading" regardless of the order of the two comparison objects in the target comment information, so that the user's preference for a particular comparison object is accurately captured. Of course, according to Embodiment I, the output opinions may both be "same", which means that the sentiment labels of the first and second sentiment preference prediction results are consistent, and this case is not repeated here.

Embodiment III

In another aspect, the present application further includes a functional module architecture that corresponds exactly to the method of training the sentiment preference recognition model for comment information of the preceding Embodiment I, i.e., an apparatus for training a sentiment preference recognition model for comment information is provided, including:

- an encoding unit configured to generate in an original channel an original text template corresponding to each group of comment training data, where each group of comment training data includes: one piece of comment information, and two comparison objects and an attribute that are extracted from the comment information, and generating in a mirror channel a mirrored text template formed by exchanging positions of the two comparison objects in the original text template; and
- a training unit configured to train and optimize, based on each piece of comment information, and corresponding original text template and mirrored text template thereof, a sentiment preference recognition model in the original channel and the mirror channel, so that the sentiment preference recognition model is used to output a sentiment preference result for the two comparison objects in the comment information in terms of the attribute.

The apparatus can be implemented by the method of training the sentiment preference recognition model for comment information provided in Embodiment I above, the specific implementation of which can be found in the description of Embodiment I and will not be repeated here.

Embodiment IV

In another aspect, the present application further includes a functional module architecture that corresponds exactly to the method of sentiment preference recognition for comment information of the preceding Embodiment II, i.e., an apparatus of sentiment preference recognition for comment information, including:

- an obtaining unit configured to obtain candidate target comment information, where the candidate target comment information includes two comparison objects and a target attribute;
- an encoding unit configured to generate a target text template for the candidate target comment information based on the two comparison objects and the target attribute, where the target text template includes: an original text template and/or a mirrored text template; and
- a recognition unit configured to input the target text template into a predetermined sentiment preference recognition model, so that the sentiment preference recognition model outputs a sentiment preference result of the two comparison objects in the candidate target comment information for the target attribute.

Here, the sentiment preference recognition model is pre-trained based on the method of training a sentiment preference recognition model for comment information as described in Embodiment I above, and the sentiment preference recognition model is selected from the sentiment preference recognition model in the original channel and/or the sentiment preference recognition model in the mirror channel based on the target text template.

Embodiment V

The present application further provides an electronic device including a processor and a memory storing a plurality of instructions, where the processor is configured to read the instructions and to execute any of the methods of the preceding Embodiments I and II. The processor and the memory may be connected via a bus or other means, using the bus connection as an example. The processor may be a Central Processing Unit (CPU). The processor may also be another general-purpose processor, a Digital Signal Processor (DSP), an Application Specific Integrated Circuit (ASIC), a Field-Programmable Gate Array (FPGA) or other programmable logic devices, discrete gate or transistor logic devices, discrete hardware components and other chips, or a combination of these types of chips.

The memory, as a non-transitory computer readable storage medium, can be used to store non-transitory software programs, non-transitory computer executable programs, and modules, such as the method of training the sentiment preference recognition model for comment information, the method of sentiment preference recognition for comment information and the program instructions/modules corresponding to the methods in the embodiments of the present application. The processor executes various functional applications of the processor and data processing by running the non-transitory software programs, instructions, and modules stored in the memory, i.e., to implement the methods in the method embodiments described above.

The memory may include a stored program area and a stored data area, where the stored program area may store the operating system, and the applications required for at least one function; the stored data area may store data created by the processor, and the like. In addition, the memory may include high-speed random access memory, and may also include non-transitory memory, such as at least one disk memory device, flash memory device, or other non-transitory solid state memory device. In some embodiments, the memory may optionally include memory that is remotely located relative to the processor, and such remote memory may be connected to the processor via a network. Examples of the networks include, but are not limited to, the Internet, corporate intranets, local area networks, mobile communication networks, and combinations thereof.

Embodiment VI

The present application also provides a computer-readable storage medium, where the computer-readable storage medium stores a plurality of instructions, the plurality of instructions being readable by a processor to execute a method as in any one of Embodiments I and II. The computer-readable storage medium may be a tangible storage medium such as random memory (RAM), memory, read-only memory (ROM), electrically programmable ROM, electrically erasable programmable ROM, registers, floppy disks, hard disks, removable storage disks, CD-ROM, or any other form of storage medium known in the art.

According to the embodiments of the present application, the different relative positions of the comparison objects in the sentence are input to the model for pre-training, which makes the model more insensitive to the relative order of the comparison objects in the sentence, improves the accuracy of sentiment preference recognition, and obtains better sentiment recognition results even with a small set of comment training data.

Although preferred embodiments of the application have been described, those skilled in the art may make additional changes and modifications to these embodiments once the basic inventive concepts are known. Therefore, the appended claims are intended to be construed to include the preferred embodiments and all changes and modifications that fall within the scope of the present application. It is clear that a person skilled in the art can make various changes and variations to the application without departing from the spirit and scope of the application. Thus, if such modifications and variations of the present application fall within the scope of the claims of the present application and their technical equivalents, the present application is also intended to include such modifications and variations.

What is claimed is:

1. A method of training a sentiment preference recognition model for comment information, comprising:
   generating in an original channel an original text template corresponding to each group of comment training data, wherein each group of comment training data comprises: one piece of comment information, and two comparison objects and an attribute that are extracted from the comment information;
   generating in a mirror channel a mirrored text template formed by exchanging positions of the two comparison objects in the original text template; and
   training and optimizing, based on each piece of comment information, and corresponding original text template and mirrored text template thereof, a sentiment preference recognition model in the original channel and the mirror channel, so that the sentiment preference recognition model is used to output a sentiment preference result for the two comparison objects in the comment information in terms of the attribute,
   wherein the sentiment preference recognition model comprises: a pre-trained language model and a classifier;
   the pre-trained language model is configured to encode input comment information and corresponding original text template thereof or corresponding mirrored text template thereof to output result data of the comment information, wherein the result data comprises: a sentence expression vector and an opinion expression vector; and
   the classifier is configured to generate, based on the result data output by the pre-trained language model in a same channel as the classifier, a sentiment preference prediction result corresponding to the comment information, wherein the sentiment preference prediction result comprises respective percentages of same, better and worse in sentiment preference.

2. The method of claim 1, wherein the training and optimizing, based on each piece of comment information, and corresponding original text template and mirrored text template thereof, a sentiment preference recognition model in the original channel and the mirror channel, further comprises:
   training, based on each piece of comment information and corresponding original text template thereof, a first pre-trained language model in the original channel, and employing a first classifier in the original channel to generate a first sentiment preference prediction result corresponding to the comment information based on the result data output from the first pre-trained language model;
   training, based on each piece of comment information and corresponding mirrored text template thereof, a second pre-trained language model in the mirror channel, and employing a second classifier in the mirror channel to generate a second sentiment preference prediction result corresponding to the comment information based on the result data output from the second pre-trained language model;
   generating a current opinion target based on the first sentiment preference prediction result and the second sentiment preference prediction result, and, generating a current comparison target based on the opinion expression vector in the result data output by the first pre-trained language model and the second pre-trained language model, respectively; and
   performing target optimization on the first pre-trained language model, the second pre-trained language model, the first classifier and the second classifier using the current comparison target and the current opinion target, and iteratively training the optimized first pre-trained language model, the optimized second pre-trained language model, the optimized first classifier and the optimized second classifier.

3. The method of claim 2, wherein the generating a current opinion target based on the first sentiment preference prediction result and the second sentiment preference prediction result, further comprises:
   performing a minimization calculation for cross-entropy function on the first sentiment preference prediction result and the second sentiment preference prediction result by taking a cross-entropy function of the original channel and a cross-entropy function of the mirror channel as an opinion target loss function, to obtain the current opinion target.

4. The method of claim 2, wherein the generating a current comparison target based on the opinion expression vector in the result data output by the first pre-trained language model and the second pre-trained language model, respectively, further comprises:
   obtaining a cosine similarity between the opinion expression vectors in the result data output by the first pre-trained language model and the second pre-trained language model; and
   in response to the opinion expression vectors in the result data output by the first pre-trained language model and the second pre-trained language model being better and worse, respectively, performing distance maximization calculation on the opinion expression vector output by each of the first pre-trained language model and the second pre-trained language model by taking a hinge loss function of the cosine similarity as a comparison target loss function, to obtain the current comparison target.

5. The method of claim 4, wherein the generating a current comparison target based on the opinion expression vector in the result data output by the first pre-trained language model and the second pre-trained language model, respectively, further comprises:
   in response to the opinion expression vectors in the result data output by the first pre-trained language model and the second pre-trained language model being both the same, performing distance minimization calculation on the opinion expression vector output by each of the first pre-trained language model and the second pre-trained language model by taking a hinge loss function of the cosine similarity as a comparison target loss function, to obtain the current comparison target.

6. The method of claim 2, wherein the performing target optimization on the first pre-trained language model, the second pre-trained language model, the first classifier and the second classifier using the current comparison target and the current opinion target, further comprises:
calculating a target function for model training based on the current comparison target and the current opinion target; and
performing target optimization on the first pre-trained language model, the second pre-trained language model, the first classifier and the second classifier based on the target function, wherein the first pre-trained language model and the second pre-trained language model share parameters, and the first classifier and the second classifier share parameters.

7. The method of claim 3, wherein the performing target optimization on the first pre-trained language model, the second pre-trained language model, the first classifier and the second classifier using the current comparison target and the current opinion target, further comprises:
calculating a target function for model training based on the current comparison target and the current opinion target; and
performing target optimization on the first pre-trained language model, the second pre-trained language model, the first classifier and the second classifier based on the target function, wherein the first pre-trained language model and the second pre-trained language model share parameters, and the first classifier and the second classifier share parameters.

8. The method of claim 4, wherein the performing target optimization on the first pre-trained language model, the second pre-trained language model, the first classifier and the second classifier using the current comparison target and the current opinion target, further comprises:
calculating a target function for model training based on the current comparison target and the current opinion target; and
performing target optimization on the first pre-trained language model, the second pre-trained language model, the first classifier and the second classifier based on the target function, wherein the first pre-trained language model and the second pre-trained language model share parameters, and the first classifier and the second classifier share parameters.

9. The method of claim 5, wherein the performing target optimization on the first pre-trained language model, the second pre-trained language model, the first classifier and the second classifier using the current comparison target and the current opinion target, further comprises:
calculating a target function for model training based on the current comparison target and the current opinion target; and
performing target optimization on the first pre-trained language model, the second pre-trained language model, the first classifier and the second classifier based on the target function, wherein the first pre-trained language model and the second pre-trained language model share parameters, and the first classifier and the second classifier share parameters.

10. A method of sentiment preference recognition for comment information, comprising:
obtaining candidate target comment information, wherein the candidate target comment information comprises two comparison objects and a target attribute;
generating a target text template for the candidate target comment information based on the two comparison objects and the target attribute, wherein the target text template comprises: an original text template and/or a mirrored text template; and
inputting the target text template into a predetermined sentiment preference recognition model, so that the sentiment preference recognition model outputs a sentiment preference result of the two comparison objects in the candidate target comment information for the target attribute;
wherein the sentiment preference recognition model is pre-trained based on the method of training a sentiment preference recognition model for comment information of claim 1, and the sentiment preference recognition model is selected from the sentiment preference recognition model in the original channel and/or the sentiment preference recognition model in the mirror channel based on the target text template.

11. A method of sentiment preference recognition for comment information, comprising:
obtaining candidate target comment information, wherein the candidate target comment information comprises two comparison objects and a target attribute;
generating a target text template for the candidate target comment information based on the two comparison objects and the target attribute, wherein the target text template comprises: an original text template and/or a mirrored text template; and
inputting the target text template into a predetermined sentiment preference recognition model, so that the sentiment preference recognition model outputs a sentiment preference result of the two comparison objects in the candidate target comment information for the target attribute;
wherein the sentiment preference recognition model is pre-trained based on the method of training a sentiment preference recognition model for comment information of claim 2, and the sentiment preference recognition model is selected from the sentiment preference recognition model in the original channel and/or the sentiment preference recognition model in the mirror channel based on the target text template.

12. A method of sentiment preference recognition for comment information, comprising:
obtaining candidate target comment information, wherein the candidate target comment information comprises two comparison objects and a target attribute;
generating a target text template for the candidate target comment information based on the two comparison objects and the target attribute, wherein the target text template comprises: an original text template and/or a mirrored text template; and
inputting the target text template into a predetermined sentiment preference recognition model, so that the sentiment preference recognition model outputs a sentiment preference result of the two comparison objects in the candidate target comment information for the target attribute;
wherein the sentiment preference recognition model is pre-trained based on the method of training a sentiment preference recognition model for comment information of claim 3, and the sentiment preference recognition model is selected from the sentiment preference recognition model in the original channel and/or the sentiment preference recognition model in the mirror channel based on the target text template.

13. A method of sentiment preference recognition for comment information, comprising:
  obtaining candidate target comment information, wherein the candidate target comment information comprises two comparison objects and a target attribute;
  generating a target text template for the candidate target comment information based on the two comparison objects and the target attribute, wherein the target text template comprises: an original text template and/or a mirrored text template; and
  inputting the target text template into a predetermined sentiment preference recognition model, so that the sentiment preference recognition model outputs a sentiment preference result of the two comparison objects in the candidate target comment information for the target attribute;
  wherein the sentiment preference recognition model is pre-trained based on the method of training a sentiment preference recognition model for comment information of claim 4, and the sentiment preference recognition model is selected from the sentiment preference recognition model in the original channel and/or the sentiment preference recognition model in the mirror channel based on the target text template.

14. A method of sentiment preference recognition for comment information, comprising:
  obtaining candidate target comment information, wherein the candidate target comment information comprises two comparison objects and a target attribute;
  generating a target text template for the candidate target comment information based on the two comparison objects and the target attribute, wherein the target text template comprises: an original text template and/or a mirrored text template; and
  inputting the target text template into a predetermined sentiment preference recognition model, so that the sentiment preference recognition model outputs a sentiment preference result of the two comparison objects in the candidate target comment information for the target attribute;
  wherein the sentiment preference recognition model is pre-trained based on the method of training a sentiment preference recognition model for comment information of claim 5, and the sentiment preference recognition model is selected from the sentiment preference recognition model in the original channel and/or the sentiment preference recognition model in the mirror channel based on the target text template.

15. A method of sentiment preference recognition for comment information, comprising:
  obtaining candidate target comment information, wherein the candidate target comment information comprises two comparison objects and a target attribute;
  generating a target text template for the candidate target comment information based on the two comparison objects and the target attribute, wherein the target text template comprises: an original text template and/or a mirrored text template; and
  inputting the target text template into a predetermined sentiment preference recognition model, so that the sentiment preference recognition model outputs a sentiment preference result of the two comparison objects in the candidate target comment information for the target attribute;
  wherein the sentiment preference recognition model is pre-trained based on the method of training a sentiment preference recognition model for comment information of claim 6, and the sentiment preference recognition model is selected from the sentiment preference recognition model in the original channel and/or the sentiment preference recognition model in the mirror channel based on the target text template.

16. An electronic device, comprising a processor and a memory, wherein the memory stores a plurality of instructions, and the processor is configured to read the instructions and to execute the method of training a sentiment preference recognition model for comment information of claim 1.

17. An electronic device, comprising a processor and a memory, wherein the memory stores a plurality of instructions, and the processor is configured to read the instructions and to execute the method of training a sentiment preference recognition model for comment information of claim 10.

18. A non-transitory computer-readable storage medium storing a plurality of instructions, wherein the plurality of instructions are readable by a processor to execute the method of training a sentiment preference recognition model for comment information of claim 1.

* * * * *